US007509004B2

(12) United States Patent
Coleman (10) Patent No.: US 7,509,004 B2
(45) Date of Patent: Mar. 24, 2009

(54) APERTURED FIBER OPTIC STUB FOR CONTROL OF MULTI-MODE LAUNCH CONDITION

(75) Inventor: Christopher L. Coleman, Santa Clara, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/590,502

(22) Filed: Oct. 31, 2006

(65) Prior Publication Data

US 2008/0101749 A1 May 1, 2008

(51) Int. Cl.
*G02B 6/32* (2006.01)
*G02B 6/36* (2006.01)
*G02B 6/42* (2006.01)
*H04B 10/00* (2006.01)
*H04B 10/12* (2006.01)

(52) U.S. Cl. .............................. 385/33; 385/31; 385/89; 398/139; 398/143

(58) Field of Classification Search ..................... 385/33
See application file for complete search history.

(56) References Cited

U.S. PATENT DOCUMENTS

| 5,096,301 A | * | 3/1992 | Stanley ..................... 356/73.1 |
| 5,170,448 A | * | 12/1992 | Ackley et al. ................. 385/31 |
| 5,315,680 A | * | 5/1994 | Musk et al. ................... 385/88 |
| 5,373,571 A | * | 12/1994 | Reid et al. .................... 385/31 |
| 6,061,159 A | | 5/2000 | Walsh |
| 6,070,985 A | | 6/2000 | Riser et al. |
| 6,185,346 B1 | * | 2/2001 | Asawa et al. .................. 385/28 |
| 6,304,695 B1 | | 10/2001 | Shekel |
| 6,349,159 B1 | | 2/2002 | Uebbing et al. |
| 6,408,115 B1 | | 6/2002 | McIntyre |
| 6,419,405 B1 | | 7/2002 | Boscha |
| 6,556,329 B1 | * | 4/2003 | Simcoe et al. .............. 398/194 |
| 6,609,834 B2 | * | 8/2003 | Cunningham et al. ......... 385/60 |
| 6,782,161 B2 | | 8/2004 | Barolet et al. |
| 6,804,436 B2 | | 10/2004 | Healy |
| 6,810,175 B1 | | 10/2004 | Wey et al. |
| 6,905,260 B2 | | 6/2005 | Anderson et al. |

(Continued)

OTHER PUBLICATIONS

Haas et al.; "A Mode-Filtering Scheme for Improvement of the Bandwidth-Distance Product in Multimode Fiber Systems"; Jul. 1993; Journal of Lightwave Technology; vol. 11, No. 7; pp. 1125-1131.*

(Continued)

*Primary Examiner*—Hemang Sanghavi
*Assistant Examiner*—Kajli Prince (57) ABSTRACT

Disclosed are various embodiments of systems, devices, components and methods for launching high-transmission-rate optical communication signals into legacy fiber optic cables. At least one aperture is provided on a proximal end of single-mode fiber optic stub so as to block or otherwise control the propagation of unwanted light into and through the stub. In one embodiment, a low-cost spheroidal lens is mounted between the optical transmitter and the proximal end of the fiber optic stub to focus and direct light emitted by the optical transmitter towards the fiber optic stub. The relatively broad light beam formed by the low-cost lens, in combination with the aperture, removes the requirement to precisely align the transmitter, lens and stub with one another, and further does away with the conventional requirement to attenuate the amount of signal power provided to the fiber optic stub.

26 Claims, 7 Drawing Sheets

U.S. PATENT DOCUMENTS

| | | | |
|---|---|---|---|
| 6,955,478 B2 * | 10/2005 | Durrant et al. | 385/76 |
| 6,961,489 B2 | 11/2005 | Cox et al. | |
| 7,021,836 B2 | 4/2006 | Anderson et al. | |
| 7,050,692 B2 | 5/2006 | Harlan et al. | |
| 7,113,267 B1 | 9/2006 | Suzuki et al. | |
| 2002/0037142 A1 | 3/2002 | Rossi | |
| 2004/0031288 A1 * | 2/2004 | Blinov | 65/390 |
| 2004/0131325 A1 | 7/2004 | Mueller et al. | |
| 2006/0013532 A1 * | 1/2006 | Wan | 385/31 |

OTHER PUBLICATIONS

Thon et al.; "Serial EDC Proposal for 10GBASE-LRM—Working Document"; Jul. 2004; pp. 1-11.*

"Serial EDC Proposal for 10GBASE-LRM," Jul. 7, 2004.

* cited by examiner

FIG. 1

Prior Art

APERTURED FIBER OPTIC STUB FOR CONTROL OF MULTI-MODE LAUNCH CONDITION

FIELD OF THE INVENTION

The present invention relates to the field of fiber optic communications, and more particularly to the field of enabling high-speed optical data communications over legacy fiber optic cables.

BACKGROUND

A new standard is currently being developed to support high-speed optical communications over "legacy" multi-mode optical fibers exceeding lengths of 200 meters, where data transmission rates can exceed 10 Gbps. This standard is known as 10GBASE-LRM, where LRM denotes "Long Reach Multi-Mode". Some details concerning the new LRM launch standard may be found in the "Serial EDC Proposal for 10GBASE-LRM," a copy of which is submitted on even date herewith in the accompanying Information Disclosure Statement, and which is hereby incorporated by reference herein in its entirety.

Existing legacy multi-mode fiber generally has too low of a bandwidth to permit the transfer of a clean 10 Gbps signal through optical fibers exceeding 200 meters in length. The LRM standard requires recovering information from a noisy received signal by compensating for the dispersion introduced by legacy multi-mode fiber through the use of appropriate signal processing techniques (i.e., deconvolution). An important part of guaranteeing the success of data recovery is to control carefully how an optical signal is launched into a legacy multi-mode fiber optic cable by an optical transmitter. The LRM standard requires that a sharply focused, single-mode quality optical spot be presented to the input face of the legacy multi-mode fiber optic cable in order to guarantee data link success.

What is needed is a system, device and method for launching optical communications signals into a legacy multi-mode fiber optic cable that permits high-speed, accurate data transmission at a reasonable cost.

Various patents containing subject matter relating directly or indirectly to the field of the present invention include, but are not limited to, the following:

U.S. Pat. No. 5,781,674 to Asai for "Ferrule for optical fiber connector," Jul. 14, 1998.

U.S. Pat. No. 6,004,044 to Paulus et al. for "Optoelectric connector," Dec. 21, 1999.

U.S. Pat. No. 6,061,159 to Walsh for "Mixed fiber adapter cable," May 9, 2000.

U.S. Pat. No. 6,070,985 to Riser et al. for "Multiport illuminator for light guides," Jun. 6, 2000.

U.S. Pat. No. 6,304,695 to Shekel for "Modulated light source," Oct. 16, 2001.

U.S. Pat. No. 6,349,159 to Uebbing et al. for "Lenses that launch high bandwidth modes into a fiber optic cable while eliminating feedback to a laser," Feb. 19, 2002.

U.S. Pat. No. 6,408,115 to Mcintyre for "Multi-port optical coupling system using anomorphic lenses to correct for aberration," Jun. 18, 2002.

U.S. Pat. No. 6,419,405 to Boscha for "Optical fiber/optical component assembly," Jul. 16, 2002.

U.S. Pat. No. 6,609,834 to Cunningham et al. for "Multi-mode communications systems," Aug. 26, 2003.

U.S. Pat. No. 6,782,161 to Barolet et al. for "Laser diode apparatus provided with an aiming beam and injection method therefor," Aug. 24, 2004.

U.S. Pat. No. 6,804,436 to Healy et al. for "Eye-safe optical fiber transmitter unit," Oct. 12, 2004.

U.S. Pat. No. 6,810,175 to Wey et al. for "Off-axis mode scrambler," Oct. 26, 2004.

U.S. Pat. No. 6,905,260 to Anderson et al. for "Method and apparatus for coupling optical elements to optoelectronic devices for manufacturing optical transceiver modules," Jun. 14, 2005.

U.S. Pat. No. 6,955,478 to Durrant et al. for "Stub having an optical fiber," Oct. 18, 2005.

U.S. Pat. No. 6,961,489 to Cox et al. for "High speed optical system," Nov. 1, 2005.

U.S. Pat. No. 7,021,836 to Anderson et al. for "Attenuator and conditioner," Apr. 4, 2006.

U.S. Pat. No. 7,050,692 to Harlan et al. for "Proximal coupler for optical fibers," May 23, 2006.

U.S. Pat. No. 7,113,267 to Suzuki et al. for "System and instrument to verify routing and measure insertion losses of multiple fiber optic assemblies," Sep. 26, 2006.

U.S. Patent Publication No. 20020037142 to Rossi for "Thermally and mechanically stable low-cost high thermal conductivity structure for single-mode fiber coupling to laser diode," Mar. 28, 2002.

U.S. Patent Publication No. 20040131325 to Mueller et al. for "Machining an insulated optical fibre," Jul. 8, 2004.

The dates of the foregoing publications may correspond to any one of priority dates, filing dates, publication dates and issue dates. Listing of the above patents and patent applications in this background section is not, and shall not be construed as, an admission by the applicants or their counsel that one or more publications from the above list constitutes prior art in respect of the applicant's various inventions. All printed publications and patents referenced herein are hereby incorporated by referenced herein, each in its respective entirety.

Upon having read and understood the Summary, Detailed Descriptions and Claims set forth below, those skilled in the art will appreciate that at least some of the systems, devices, components and methods disclosed in the printed publications listed herein may be modified advantageously in accordance with the teachings of the various embodiments of the present invention.

SUMMARY

Disclosed herein are various embodiments of systems, devices, components and methods for launching high-transmission-rate optical communication signals into a legacy fiber optic cable.

In one embodiment of the present invention, there is provided a multi-mode fiber optic launch assembly comprising a single-mode fiber optic stub comprising a core for transmitting light signals and a cladding disposed thereabout, where the stub has distal and proximal ends. At least one aperture is located on one or more ends of the fiber optic stub, the aperture being configured to prevent or inhibit light incident thereon from entering or exiting the cladding, or entering the legacy fiber optic cable connected thereto. An optical signal transmitter and a lens configured to focus light signals emitted by the transmitter towards the proximal end of the fiber optic stub are also provided.

The lens is positioned between the optical signal transmitter and the proximal end of the fiber optic stub, and light incident on the proximal end of the core is transmitted through the stub to the distal end thereof. The lens may be any one or more of an aspherical lens, a convex lens, a compound convex-concave lens, a compound lens, a ball, and a spheroidal lens, and may be formed of glass, plastic, a polymer, a polymeric compound, a semiconductor material, a crystalline material or a sapphire. Other suitable materials may also be employed.

The aperture may comprise a coating disposed on the proximal and/or distal end of the fiber optic stub, where the coating comprises an optically opaque material, an optically refractive material, an optically reflective material, an optically absorbing material, an optically scattering material, an optically diffractive material, epoxy, an adhesive, an adhesive-backed substrate, a polymer, a cross-linked polymer, a plastic, a film, a thick film, a sputtered coating, or a vapor deposited coating. The aperture may also be formed by removing cladding from the proximal and/or distal end of the fiber optic stub and backfilling at least a portion of the removed cladding with an appropriate material. Alternatively, the aperture may be formed by coating the proximal and/or distal end of the fiber optic stub with an appropriate material, and directing a laser beam into the core so as to burn or ablate a hole through the coating. The cladding of the fiber optic stub may also be doped to form the aperture.

In another embodiment of the present invention, there is provided a method of launching fiber optic light signals into a legacy multi-mode fiber optic cable, where the method comprises providing a single-mode fiber optic stub comprising a core for transmitting light signals and a cladding disposed thereabout, the stub having distal and proximal ends; providing at least one aperture at one or more ends of the fiber optic stub, the aperture being configured to prevent or inhibit light incident thereon from entering or exiting the cladding, or entering the legacy fiber optic cable connected thereto; providing an optical light signal transmitter, providing a lens configured to focus light emitted by the transmitter towards the proximal end of the stub, and positioning the lens between the transmitter and the proximal end of the stub such that light incident on the proximal end of the core is transmitted through the stub to the distal end thereof.

In yet another embodiment of the present invention, there is provided a method of making a multi-mode fiber optic launch assembly comprising providing a single-mode fiber optic stub comprising a core for transmitting light signals and a cladding disposed thereabout, the stub having distal and proximal ends; forming at least one aperture at one or more ends of the fiber optic stub, the aperture being configured to prevent or inhibit light incident thereon from entering or exiting the cladding, or entering the legacy fiber optic cable connected thereto; providing an optical signal transmitter; providing a lens configured to focus light signals emitted by the transmitter towards the proximal end of the stub, and positioning the lens between the transmitter and the proximal end of the stub such that light incident on the proximal end of the core is transmitted through the stub to the distal end thereof.

In addition to the foregoing embodiments of the present invention, review of the detailed description and accompanying drawings will show that other embodiments of the present invention exist. Accordingly, many combinations, permutations, variations and modifications of the foregoing embodiments of the present invention not set forth explicitly herein will nevertheless fall within the scope of the present invention.

BRIEF DESCRIPTION OF THE DRAWINGS

Different aspects of the various embodiments of the present invention will become apparent from the following specification, drawings and claims in which:

FIGS. 4A through 4c show cross-sectional views illustrating the formation of a fiber optic stub according to one embodiment of the present invention;

FIGS. 5A through 5c show cross-sectional views illustrating the formation of a fiber optic stub according to another embodiment of the present invention;

The drawings are not necessarily to scale. Like numbers refer to like parts or steps throughout the drawings.

DETAILED DESCRIPTIONS OF SOME PREFERRED EMBODIMENTS

Set forth below are detailed descriptions of some preferred embodiments of the systems, devices, components and methods of the present invention. Disclosed herein are various embodiments of systems, devices, components and methods for launching high-transmission-rate optical communication signals into a legacy fiber optic cable.

As employed in the specification, drawings and claims hereof, the term "aperture" means a device or means for extinguishing, refracting, reflecting, absorbing, scattering, diffracting, attenuating or blocking the transmission of light signals, and especially laser-generated light signals, through or into an undesired portion of a optical light guide or light-transmitting optical fiber (e.g., fiber optic cladding), and the transmission of light signals, and especially laser-generated light signals, through or into an desired portion of a optical light guide or light-transmitting optical fiber (e.g., a fiber optic core).

Further as employed in the specification, drawings and claims hereof, the term "spheroidal" means an object having any one or more of a spherical shape, an ovoidal shape, an ellipsoidal shape, a globular shape, a globoidal shape, a ball-shape, or a shape similar to any of the foregoing shapes, alone or in combination.

Figure 1:
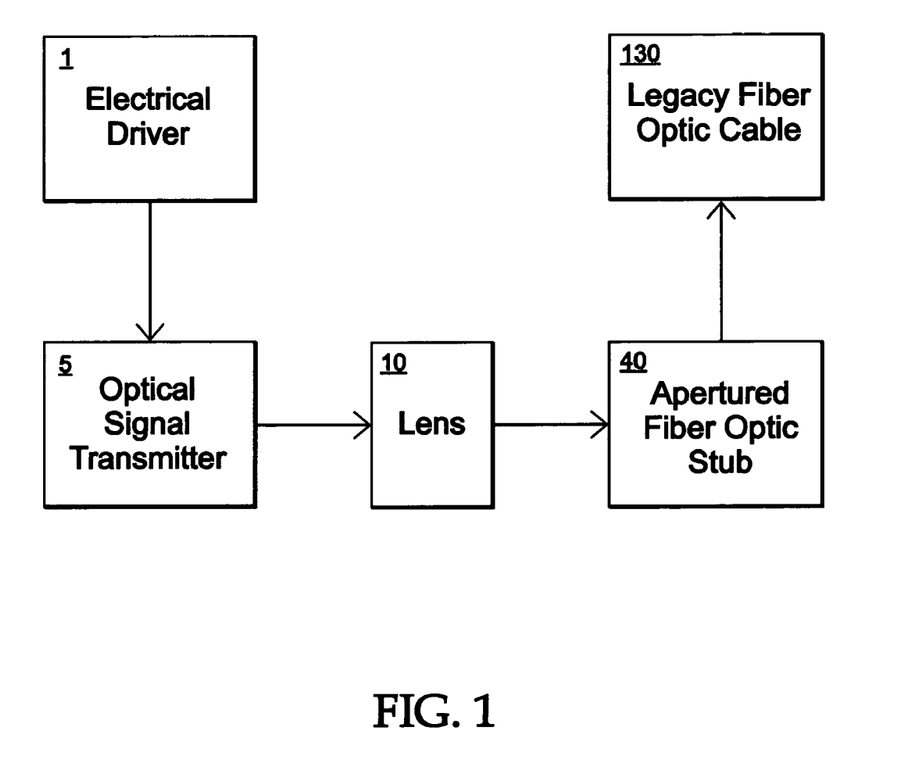
FIG. 1 shows a block diagram of one embodiment of a multi-mode optical transmission system of the present invention.

FIG. 1 shows a block diagram of one embodiment of a multi-mode optical transmission system of the present invention. Electrical driver or other device 1 provides communication signals in an appropriate format to optical signal transmitter 5 in a manner well known in the art, which in turn transmits optical signals (e.g., laser-generated signals) therefrom through lens 10 towards apertured fiber optic stub 40 (more about which I say below). Lens 10 focuses optical signals emitted by optical signal transmitter 5 and directs them towards single-mode fiber optic stub 40, which comprises a core 60 for transmitting light signals and a cladding disposed thereabout. Light signals are then launched through single-mode fiber optic stub 40 into legacy fiber optic cable 130. Stub 40 has distal and proximal ends 110 and 120, respectively, with proximal end 110 being located nearest lens 10. Lens 10 and single-mode fiber optic stub 40 are most preferably housed in a mechanical enclosure, which has attached thereto a receptacle for attachment to a corresponding ferrule connected to legacy fiber optic cable 130. Common connector standards that may be employed to mate fiber optic stub 50 with legacy fiber optic cable 130 include SC and LC connector standards well known in the art. Legacy fiber optic cable 130 typically comprises optical fibers conforming to OM-1 or OM-2 standards.

Figure 2:
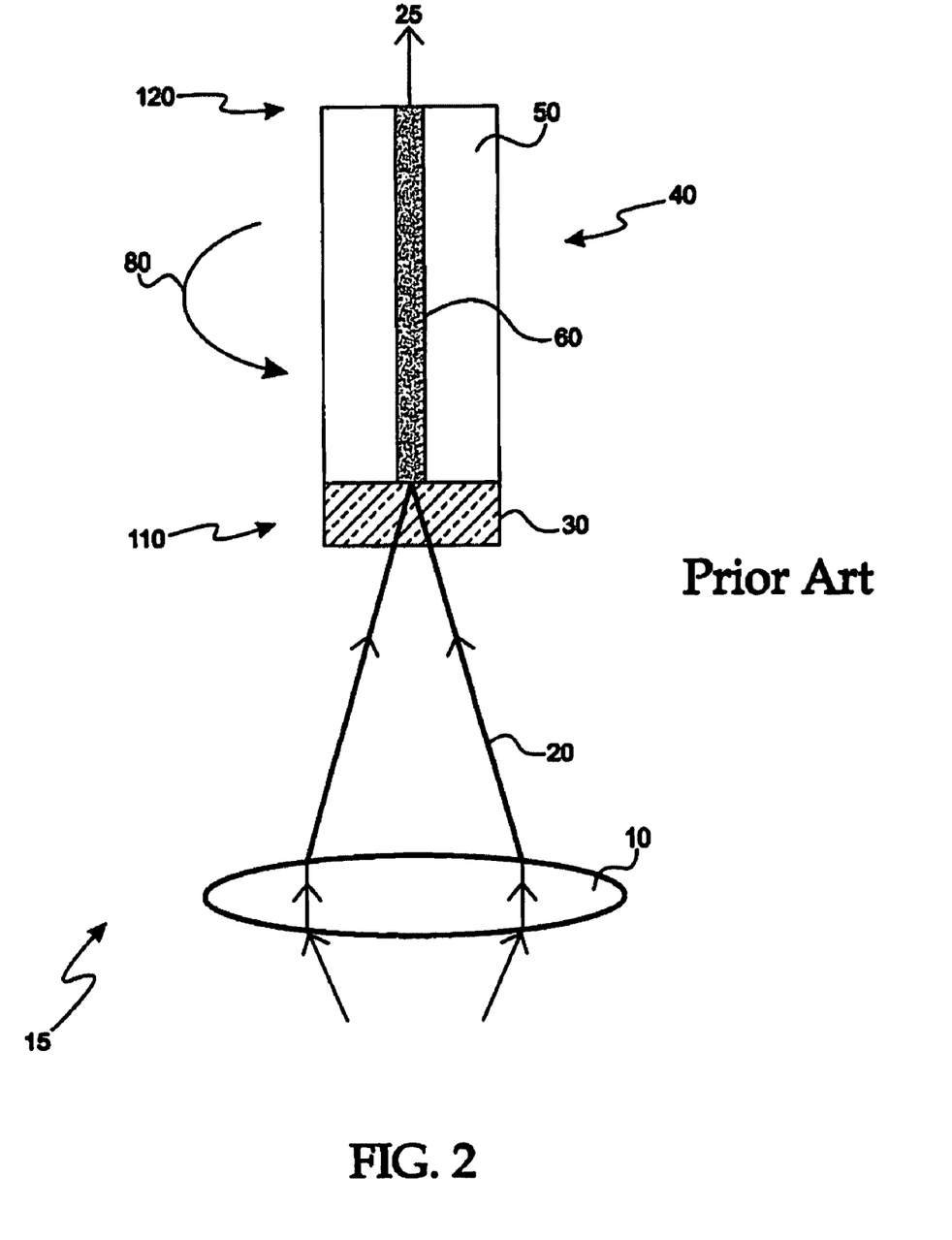
FIG. 2 shows a cross-sectional view of one embodiment of a multi-mode fiber optic launch assembly.

FIG. 2 shows a cross-sectional view of one embodiment of a multi-mode fiber optic launch assembly, where a relatively expensive aspherical lens 10 having few aberrations is employed to focus optical (e.g., laser) signals emanating from an optical signal transmitter 5 (not shown in FIG. 2) towards core 60 of single-mode fiber optic stub 40 in a tightly focused beam 20. In the embodiment illustrated in FIG. 2, beam 20 must be aligned relatively precisely with core 60 to permit accurate transmission of optical (e.g., laser-generated) signals to legacy fiber optic cable 130 (not shown in FIG. 2) that is operably connected to the output of fiber optic stub 40 represented by output beam 25.

While the embodiment of multi-mode fiber optic launch assembly 15 illustrated in FIG. 2 provides a high-quality focused beam to single-mode fiber optic stub 40, such assembly 15 is also likely to pump excessive signal power into legacy fiber optic cable 130 unless assembly 15 is somehow configured to attenuate the excessive signal power that has been provided thereto. Such a function may be provided by polarizer 30, which may be attached to proximal end 110 of fiber optic stub 40 and rotated (as depicted by arrow 80 in FIG. 2) to reduce the amount of power provided to stub 40 without otherwise appreciably affecting launch beam 20 or the spot quality thereof.

The embodiment illustrated in FIG. 2 further suffers from the drawbacks of requiring an expensive lens, an expensive polarizer, precise alignment of beam 20, core 60 and fiber optic stub 40 (necessitating tight manufacturing tolerances, low yields and high costs), and the addition of a polarizer rotation sequence into the alignment algorithm (which in turn increases the amount of time required to place assembly 15 into service).

Figure 3:
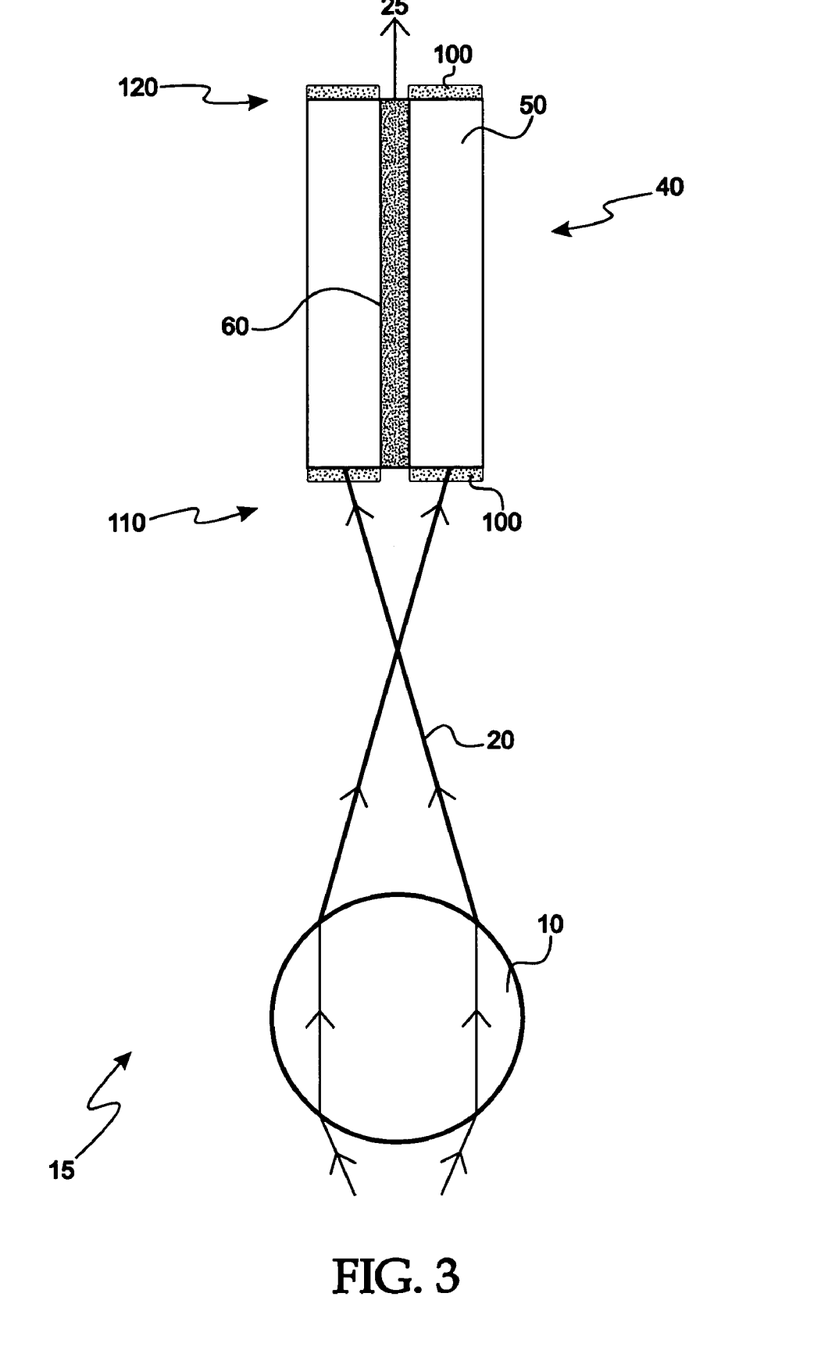
FIG. 3 shows a cross-sectional view of one embodiment of a multi-mode fiber optic launch assembly of the present invention.

FIG. 3 shows one embodiment of a multi-mode fiber optic launch assembly, where a relatively inexpensive spheroidal lens 10 is employed to focus optical (e.g., laser) signals emanating from optical signal transmitter 5 (not shown in FIG. 3) towards core 60 of single-mode fiber optic stub 40 in a relatively broad beam 20. Spheroidal lens 10 is positioned between the optical transmitter 5 and proximal end 110 of fiber optic stub 40 such that at least a portion of light incident on proximal end 110 of stub 40 is transmitted therethrough to distal end 120 thereof.

One aperture 100 is located at proximal end 110 of single-mode fiber optic stub 40 in the embodiment of the present invention illustrated in FIG. 3. Another aperture 100 is located at distal end 120 of single-mode fiber optic stub 40 in the embodiment of the present invention illustrated in FIG. 3. Proximal aperture 100 is configured to prevent or inhibit light from entering cladding 50 of fiber stub 40, but to permit light incident on core 60 to be transmitted through core 60 to form exit beam 25. Distal aperture 100 is configured to prevent or inhibit light from exiting cladding 50 of fiber stub 40, but to permit light transmitted through core 60 to form exit beam 25. Note that either or both of proximal aperture 100 and distal aperture 100 may be employed successfully to launch light signals into a legacy fiber optic cable. Although proximal and distal apertures 100 are both illustrated in FIG. 3, in actual practice one such aperture may be sufficient to provide sufficient launch performance.

As discussed in more detail below, aperture 100 may be formed in any of a number of different ways using any of a number of different materials and physical configurations. Aperture 100 is a device for blocking the transmission of light signals, and especially laser-generated light signals, through or into an undesired portion of a optical light guide or light-transmitting optical fiber (e.g., fiber optic cladding), and the transmission of light signals, and especially laser-generated light signals, through or into an desired portion of a optical light guide or light-transmitting optical fiber (e.g., a fiber optic core). For example, aperture 100 may be formed by placing optically opaque inclusions or a ring or the like in the body of cladding 50 between proximal end 110 and distal end 120 to accomplish substantially the same result as a coating disposed on one or more ends of fiber optic stub 40.

In the embodiment of the present invention illustrated in FIG. 3, beam 20 need not be aligned precisely with core 60 to permit accurate transmission of optical (e.g., laser-generated) signals to a multi-mode legacy fiber optic cable that is operably connected to the output of fiber optic stub 40 represented by output beam 25. In contrast to the launch assembly illustrated in FIG. 2, the embodiment of the present invention illustrated in FIG. 3 meets the requirements of the LRM standard for launch control, but does so without adding to the complexity of launch assembly 15, and without requiring tight tolerances for the alignment of transmitter 5, lens 10 and fiber optic stub 40. In a manner similar to that required for launch system 15 of FIG. 2, prior art single-mode optical transmitters, lenses and fiber optic stubs have typically been aligned by determining the precise location of the focused beam provided by the transmitter and lens, measuring the launched power, and defocusing the fiber in the beam to reduce the power until a correct amount of power is provided to fiber optic stub 40.

Launch assembly 15 illustrated in FIG. 3 features several important advantages relative to prior art launch assemblies, including, but not limited to: (1) one or more lenses having a spheroidal shape that may be manufactured and provided at low cost, and that may be used to form wider, more blurry or less tightly focused beams 20; (2) wider beam 20 incident on proximal end 110 of fiber optic stub 40 provides greater manufacturing, assembly and use tolerances and yields, and lower costs, for launch assembly 15; (3) no polarizer rotation step is required during beam alignment, which reduces cycle time and decreases cost, and (4) attenuation of optical signals pumped into single-mode fiber optic stub 40 is easily accomplished by moving fiber optic stub 40 closer to or further from the focused spot formed by beam 20. As a result, it will now be seen that the embodiment of the present invention shown in FIG. 3 maintains many of the advantages inherent in prior art single-mode launch assemblies while still meeting optical launch requirements for the new LRM standard.

Note that the present invention is not limited to the use of spheroidal lenses 10 in assembly 15. Indeed, other types of lenses 10 may be employed successfully in assembly 15, including aspherical lenses, convex lenses, compound convex-concave lenses, compound lenses, diffraction lenses, holographic lenses, fresnel lenses, and other types of suitable lenses well known to those in the art. Materials suitable for use in forming lens 10 include, but are not limited to, one or more of glass, plastic, a polymer, a polymeric compound, a semiconductor material, a crystalline material and a sapphire.

Lens 10 preferably ranges between about 200 microns and about 5000 microns in diameter.

According to the well known SC industry standard, fiber optic stub 40 has a diameter of 2.5 mm; under the well known LC industry standard, the diameter is 1.25 mm. The length of fiber optic stub 40 preferably ranges between about 2 mm and about 10 mm, has a core diameter of 9 microns, and an overall cladding diameter of 125 microns. With the possible exception of aperture 100, fiber optic stubs 40 and receptacles suitable for use in the present invention may be provided by any one of ADAMANT™, KYOCERA™ or TOTO™, all based in Japan.

In one embodiment of the present invention, aperture 100 is formed by disposing a coating over the proximal end of cladding 50. Such a coating may be formed by placing epoxy, an adhesive, an adhesive-backed substrate, a polymer, a cross-linked polymer, a plastic, a film, a thick film, a sputtered coating, a vapor deposited coating, a metal coating (e.g., an aluminum or carbon blend) or any other suitable light-extinguishing, refracting, reflecting, absorbing, scattering, diffracting, attenuating or blocking material over the proximal end of cladding 50. Such a coating should extinguish, refract, reflect, absorb, scatter, diffract, attenuate or block light incident thereon so that none or substantially none of such light reaches cladding 50 or core 60 disposed beneath aperture 100. The coating most preferably ranges between about 0.5 microns and about 5 microns in thickness.

Figure 4A:
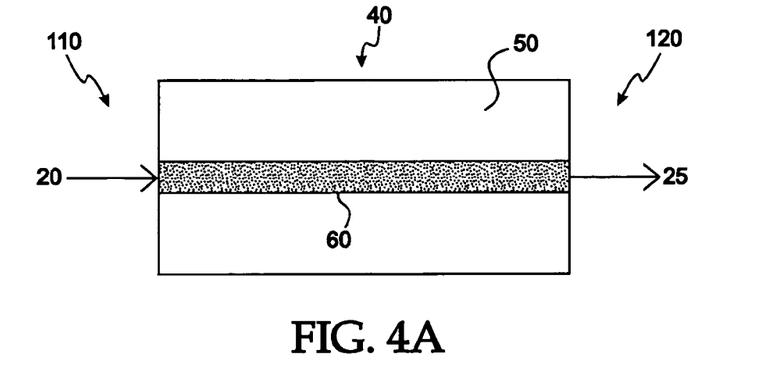
Figure 4B:
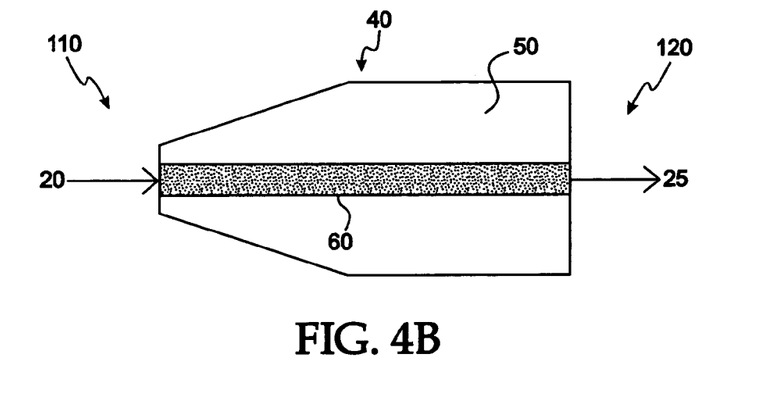
Figure 4C:
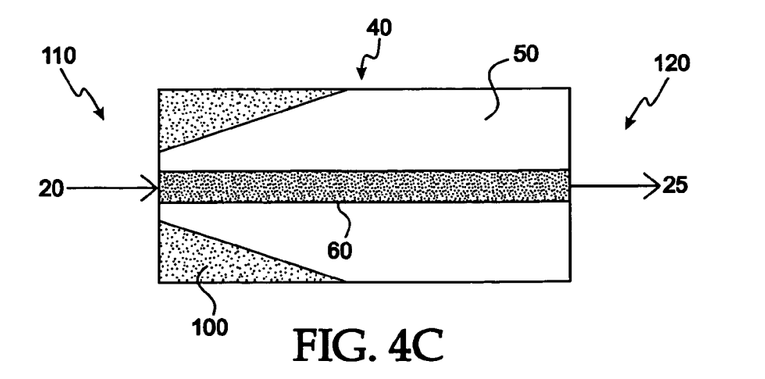

Referring now to FIGS. 4A through 4c, there are shown cross-sectional views illustrating the formation of fiber optic stub 40 according to one embodiment of the present invention. In FIG. 4A, conventional fiber optic stub 40 is provided. FIG. 4B represents fiber optic stub 40 of FIG. 4A after portions of cladding 50 have been removed from proximal end 110 of fiber optic stub 50, most preferably by grinding or polishing away sufficient amounts of cladding 50. Removal of cladding 50 from proximal end 110 of fiber optic stub 50 may also be achieved by cutting, etching, burning, abrading or otherwise suitably removing cladding material from proximal end 110. FIG. 4C shows aperture 100 formed by backfilling removed cladding with epoxy, although any suitable optically opaque material, an optically refractive material, an optically reflective material and an optically absorbing material may be employed such as an adhesive, an adhesive-backed substrate, a polymer, a cross-linked polymer, a plastic, a film, a thick film, a sputtered coating, and a vapor deposited coating. such as epoxy, plastic, an adhesive, a film and a thick film.

Figure 5A:
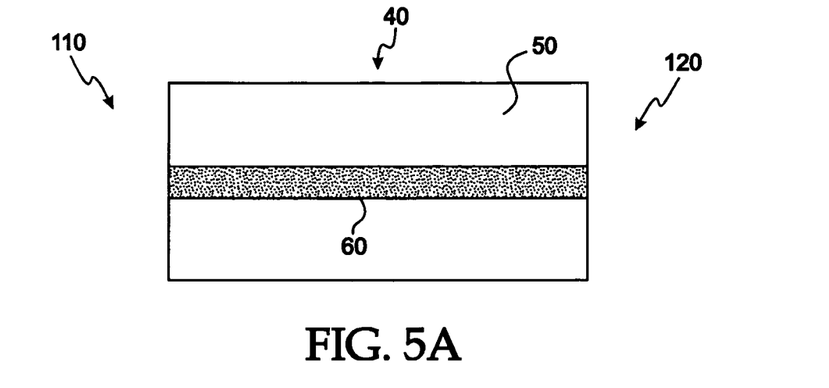
Figure 5B:
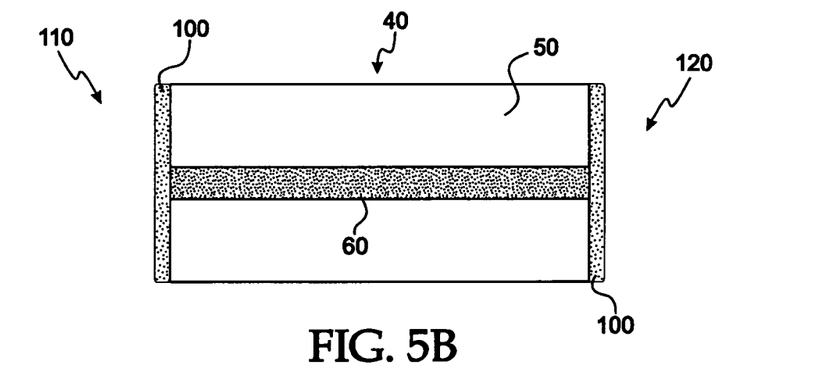
Figure 5C:
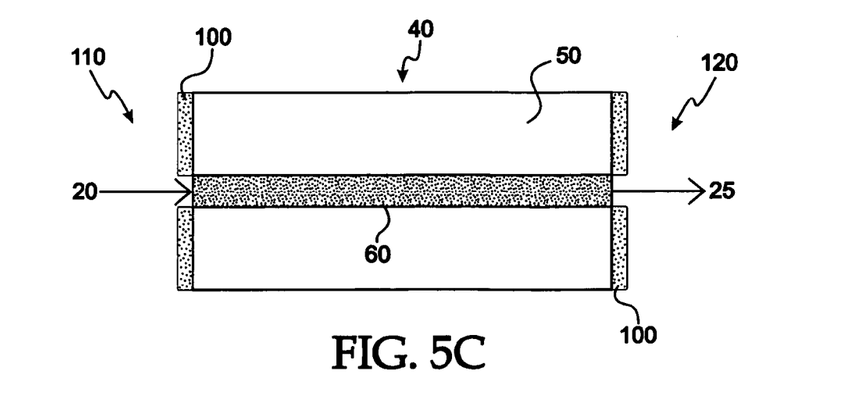

FIGS. 5A through 5c show cross-sectional views illustrating the formation of fiber optic stub 50 according to another embodiment of the present invention. Aperture 100 is formed by coating the proximal and/or distal end of fiber optic stub 50 with at least one of an appropriate optically opaque material, an optically refractive material, an optically reflective material and an optically absorbing material, and directing a laser beam into core 60 so as to burn or ablate a hole through aperture/coating 100 disposed over one end of core 60. The laser beam may be directed from either end of fiber optic stub 50 towards the opposite end to burn a suitable hole through a coating. This method of forming aperture 100 has the advantage of creating a self-aligned opening in aperture 100 which coincides perfectly or near-perfectly with fiber core 60. As in the embodiment of the present invention illustrated in FIG. 3 hereof, proximal aperture 100 is configured to prevent or inhibit light from entering cladding 50 of fiber stub 40, but to permit light incident on core 60 to be transmitted through core 60 to form exit beam 25. Distal aperture 100 is configured to prevent or inhibit light from exiting cladding 50 of fiber stub 40, but to permit light transmitted through core 60 to form exit beam 25. Either or both of proximal aperture 100 and distal aperture 100 may be employed successfully to launch light signals into a legacy fiber optic cable. Although proximal and distal apertures 100 are both illustrated in FIGS. 5B and 5C, in actual practice one such aperture may be sufficient to provide sufficient launch performance.

Figure 6:
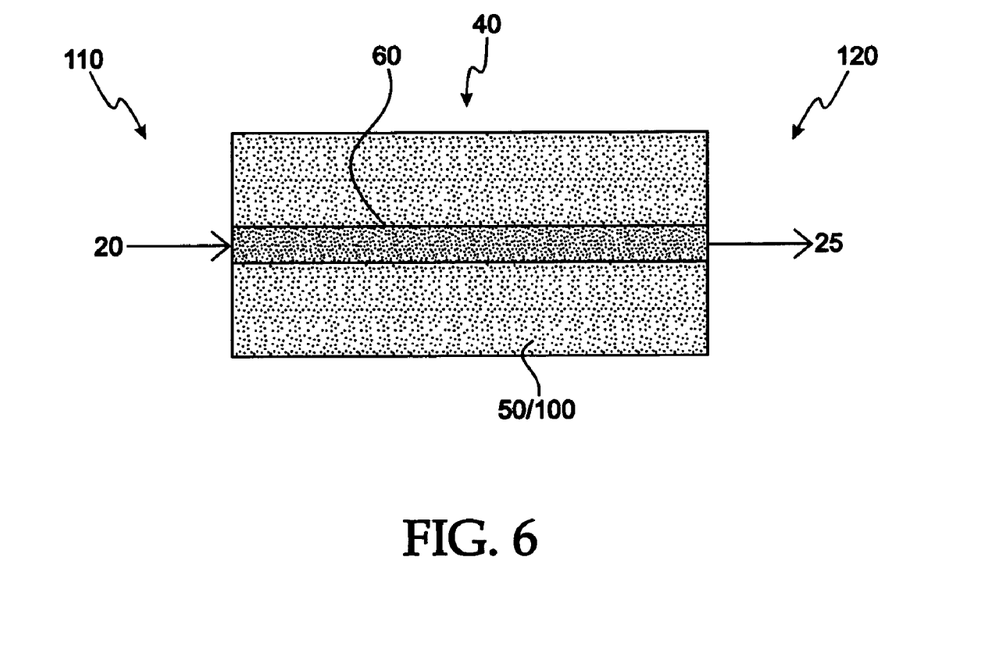
FIG. 6 shows a cross-sectional view illustrating yet another embodiment of a fiber optic stub of the present invention.

FIG. 6 shows a cross-sectional view illustrating yet another embodiment of fiber optic stub 40 of the present invention, where cladding 50 is doped to appropriately block, extinguish, absorb, reflect, refract, diffract or scatter light in such a manner that undesired portions of beam 20 incident on proximal end 110 of fiber optic stub 40 do not enter core 60 and are not transmitted therethrough. In such a manner, doped cladding 50 illustrated in FIG. 6 forms one embodiment of aperture 100 of the present invention. Cladding 50 may be doped using appropriate loading or filling compounds, or compounds containing metal particles, carbon and/or light-opaque materials. In one embodiment of the present invention, cladding 50 is doped so as to have an index of refraction substantially similar to that of otherwise similar undoped cladding so as to preserve the modal properties of the waveguide formed by fiber optic stub 40.

Figure 7:
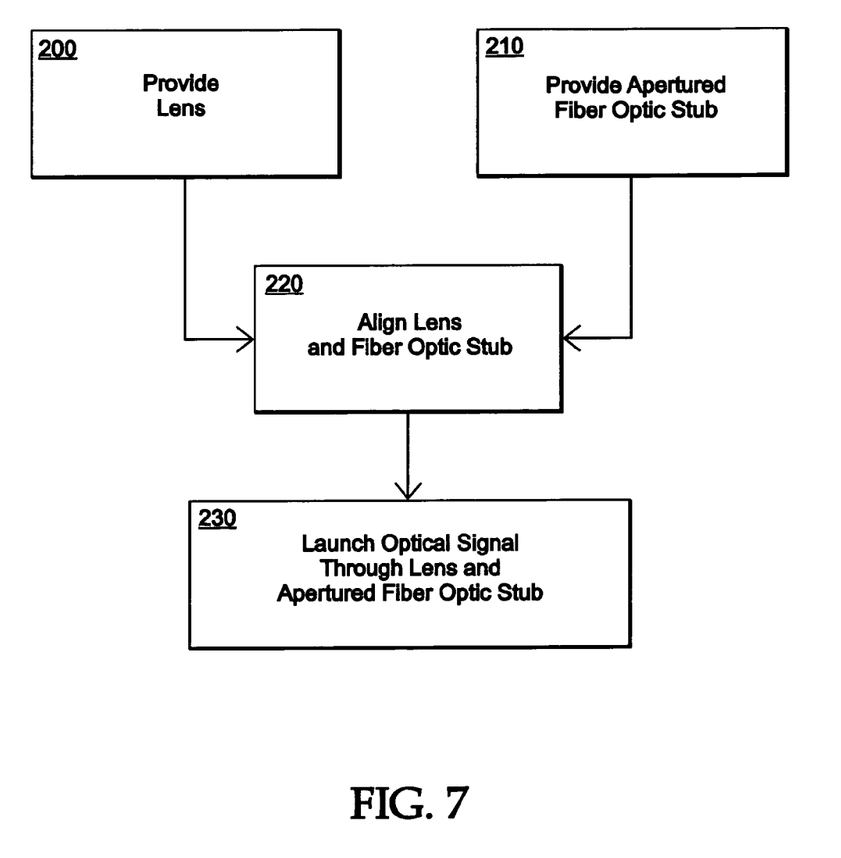
FIG. 7 illustrates one embodiment of a method of the present invention for launching an optical signal.

FIG. 7 illustrates one embodiment of a method of the present invention for launching an optical signal. In step 200, lens 10 is provided, while in step 210 single-mode fiber optic stub 40 comprising aperture 100 is provided. Lens 10 and fiber optic stub 40 are combined in step 220 to form fiber optic launch assembly 15, which most preferably includes an appropriate enclosure for housing and aligning lens 10 and fiber optic stub 40. Optical transmitter 5 is next operably aligned and connected to assembly 15, and assembly 15 is operably connected to legacy fiber optic cable 130 by means of an appropriate receptacle and mating ferrule. Finally, in step 230 optical signals emitted by optical transmitter 5 are launched through lens 10, aperture 100 and single-mode fiber optic stub 40 into legacy fiber optic cable 130.

The preceding specific embodiments are illustrative of the practice of the invention. It is to be understood, therefore, that other expedients known to those skilled in the art or disclosed herein may be employed without departing from the invention or the scope of the appended claims. Having read and understood the present disclosure, those skilled in the art will now understand that many combinations, adaptations, variations and permutations of known apertures, aperture materials, lenses, lens materials, fiber optic stubs, optical transmitters, receptacles, connectors, and ferrules, and associated methods, may be employed successfully in the present invention. Moreover, aperture 100 of the present invention is not limited to being located at one of the ends of fiber optic stub 40, and may comprise essentially the entirety of the cladding of the fiber optic stub (per FIG. 6), or may be disposed between proximal end 110 and distal end 120 of single-mode fiber optic stub 40.

In the claims, means plus function clauses are intended to cover the structures described herein as performing the recited function and their equivalents. Means plus function clauses in the claims are not intended to be limited to structural equivalents only, but are also intended to include structures which function equivalently in the environment of the claimed combination.

All printed publications and patents referenced hereinabove are hereby incorporated by referenced herein, each in its respective entirety.

I claim:

1. A multi-mode fiber optic launch assembly and a corresponding multi-mode delivery optical fiber, comprising:
   (a) a single-mode fiber optic stub comprising a length of single-mode optical fiber having a core for transmitting light signals and a cladding disposed thereabout, the stub having distal and proximal ends and a first diameter;
   (b) at least one aperture located at one or more of the proximal and distal ends of the fiber optic stub, the aperture being configured to prevent or inhibit light incident thereon from entering or exiting the cladding, the aperture forming a central opening located over at least one of the proximal and distal ends, the central opening having a second diameter;
   (c) an optical signal transmitter, and
   (d) a lens configured to focus light signals emitted by the transmitter towards the proximal end of the fiber optic stub;
   wherein the lens is positioned between the optical signal transmitter and the proximal end of the fiber optic stub, light incident on the proximal end of the core is transmitted through the stub to the distal end thereof, the first diameter is greater than the second diameter, the multi-mode delivery optical fiber is operably connected directly to the distal end of the single-mode fiber-optic stub and configured to receive light launched therefrom, the light entering the multi-mode delivery optical fiber from the fiber-optic stub is substantially free of light that has entered or exited the cladding of the fiber-optic stub, and the multi-mode fiber optic launch assembly and the multi-mode delivery optical fiber together transmit optical signals of 10 Gbps therethrough.

2. The multi-mode fiber optic launch assembly and multi-mode delivery optical fiber of claim 1, further comprising an enclosure for housing the assembly.

3. The multi-mode fiber optic launch assembly and multi-mode delivery optical fiber of claim 1, further comprising a receptacle for matingly connecting the assembly to a ferrule of the multi-mode delivery optical fiber.

4. The multi-mode fiber optic launch assembly and multi-mode delivery optical fiber of claim 3, wherein the receptacle is configured to mate with one of an SC connector ferrule and an LC connector ferrule.

5. The multi-mode fiber optic launch assembly and multi-mode delivery optical fiber of claim 1, wherein the lens is at least one of an aspherical lens, a convex lens, a compound convex-concave lens, a compound lens, a spheroidal lens, a diffraction lens, a holographic lens, and a fresnel lens.

6. The multi-mode fiber optic launch assembly and multi-mode delivery optical fiber of claim 1, wherein the lens comprises at least one of glass, plastic, a polymer, a polymeric compound, a semiconductor material, a crystalline material and a sapphire.

7. The multi-mode fiber optic launch assembly and multi-mode delivery optical fiber of claim 1, wherein the aperture comprises a coating disposed on at least one end of the fiber optic stub.

8. The multi-mode fiber optic launch assembly and multi-mode delivery optical fiber of claim 7, wherein the coating is at least one of an optically opaque material, an optically refractive material, an optically reflective material, an optically absorbing material, an optically scattering material, an optically diffractive material, epoxy, an adhesive, an adhesive-backed substrate, a polymer, a cross-linked polymer, a plastic, a film, a thick film, a sputtered coating, a metal coating, and a vapor deposited coating.

9. The multi-mode fiber optic launch assembly and multi-mode delivery optical fiber of claim 1, wherein the aperture is formed by removing cladding from one end of the fiber optic stub and backfilling at least a portion of the removed cladding with at least one of an optically opaque material, an optically refractive material, an optically reflective material, an optically absorbing material, an optically scattering material, and an optically diffractive material.

10. The multi-mode fiber optic launch assembly and multi-mode delivery optical fiber of claim 1, wherein the aperture is formed by coating at least one end of the fiber optic stub with at least one of an optically opaque material, an optically refractive material, an optically reflective material, an optically absorbing material, an optically scattering material, and an optically diffractive material, and directing a laser beam into the core so as to burn or ablate a hole through the coating.

11. The multi-mode fiber optic launch assembly and multi-mode delivery optical fiber of claim 1, wherein the cladding of the fiber optic stub is doped to absorb light.

12. The multi-mode fiber optic launch assembly and multi-mode delivery optical fiber of claim 10, wherein a doped cladding forms the aperture.

13. The multi-mode fiber optic launch assembly and multi-mode delivery optical fiber of claim 12, wherein the doped cladding has an index of refraction substantially similar to that of an undoped cladding.

14. A method of launching fiber optic light signals into a multi-mode delivery optical fiber, comprising:
   (a) providing a single-mode fiber optic stub comprising a length of single-mode optical fiber a length of single-mode optical fiber having a core for transmitting light signals and a cladding disposed thereabout, the stub having distal and proximal ends and a first diameter;
   (b) providing at least one aperture on or in the fiber optic stub, the aperture being configured to prevent or inhibit light incident thereon from entering or exiting the cladding, the aperture forming a central opening located over at least one of the proximal and distal ends, the central opening having a second diameter;
   (c) providing an optical light signal transmitter;
   (d) providing a lens configured to focus light signals emitted by the transmitter towards the proximal end of the stub;
   (e) positioning the lens between the transmitter and the proximal end of the stub such that light incident on the proximal end of the core is transmitted through the stub to the distal end thereof;
   (f) providing the multi-mode delivery optical fiber, the delivery optical fiber being configured to receive light launched from the distal end of the fiber optic stub;
   (g) operably connecting the multi-mode delivery optical fiber directly to the distal end of the single-mode fiber-optic stub;
   (h) transmitting a 10 Gbps optical signal through the multi-mode launch assembly and the multi-mode delivery optical fiber;
   wherein the light entering the multi-mode delivery optical fiber from the fiber-optic stub is substantially free of light that has entered or exited the cladding of the fiber-optic stub, and the multi-mode fiber optic launch assembly.

15. The method of claim 14, further comprising providing a receptacle for attaching the fiber optic stub to the multi-mode delivery optical fiber.

16. The method of claim 14, further comprising disposing a coating on one of the ends of the fiber optic stub to form the aperture.

17. The method of claim 14, further comprising providing at least one of an optically opaque material, an optically refractive material, an optically reflective material, an optically absorbing material, an optically scattering material, and an optically diffractive material for the coating.

18. A method of making a multi-mode fiber optic launch assembly configured for operation in conjunction with a multi-mode delivery optical fiber, comprising:
   (a) providing a single-mode fiber optic stub-comprising a length of single-mode optical fiber having a core for transmitting light signals and a cladding disposed thereabout, the stub having distal and proximal ends and a first diameter;
   (b) forming an aperture on or in the fiber optic stub, the aperture being configured to prevent or inhibit light incident thereon from entering or exiting the cladding, the aperture forming a central opening located over at least one of the proximal and distal ends, the central opening having a second diameter;
   (c) providing an optical signal transmitter;
   (d) providing a lens configured to focus light signals emitted by the transmitter towards the proximal end of the stub, and
   (e) positioning the lens between the transmitter and the proximal end of the stub such that light incident on the proximal end of the core is transmitted through the stub to the distal end thereof;
   (f) providing both the multi-mode fiber optic launch assembly and the multi-mode delivery optical fiber together to transmit optical signals of 10 Gbps;
   wherein the fiber-optic stub is further configured to launch light from the distal end thereof into the multi-mode delivery optical fiber that is substantially free of light that has entered or exited the cladding of the fiber-optic stub.

19. The method of claim 18, further comprising providing a receptacle for coupling the distal end of the fiber optic stub to the multi-mode delivery optical fiber.

20. The method of claim 18, further comprising forming the aperture with a coating disposed on at least one end of the fiber optic stub.

21. The method of claim 20, wherein the coating is at least one of an optically opaque material, an optically refractive material, an optically reflective material, an optically absorbing material, an optically scattering material, and an optically diffractive material.

22. The method of claim 18, wherein the aperture is formed by removing cladding from at least one end of the fiber optic stub and backfilling at least a portion of the removed cladding with at least one of an optically opaque material, an optically refractive material, an optically reflective material, an optically absorbing material, an optically scattering material, and an optically diffractive material.

23. The method of claim 18, wherein the aperture is formed by coating at least one end of the fiber optic stub with at least one of an optically opaque material, an optically refractive material, an optically reflective material, an optically absorbing material, an optically scattering material, and an optically diffractive material, and directing a laser beam into the core so as to burn or ablate a hole through the coating.

24. The method of claim 18, wherein the cladding of the fiber optic stub is doped to absorb light.

25. The method of claim 18, wherein the doped cladding forms the aperture.

26. The method of claim 18, wherein the doped cladding has an index of refraction substantially similar to that of undoped cladding.

* * * * *

UNITED STATES PATENT AND TRADEMARK OFFICE
CERTIFICATE OF CORRECTION

| | | |
|---|---|---|
| PATENT NO. | : 7,509,004 B2 | Page 1 of 1 |
| APPLICATION NO. | : 11/590502 | |
| DATED | : March 24, 2009 | |
| INVENTOR(S) | : Christopher Coleman | |

It is certified that error appears in the above-identified patent and that said Letters Patent is hereby corrected as shown below:

Column 10, lines 60-61, Claim 14, delete ", and the multi-mode fiber optic launch assembly." and insert --.--.

Signed and Sealed this
Fourth Day of January, 2011

David J. Kappos
*Director of the United States Patent and Trademark Office*